UNITED STATES PATENT OFFICE.

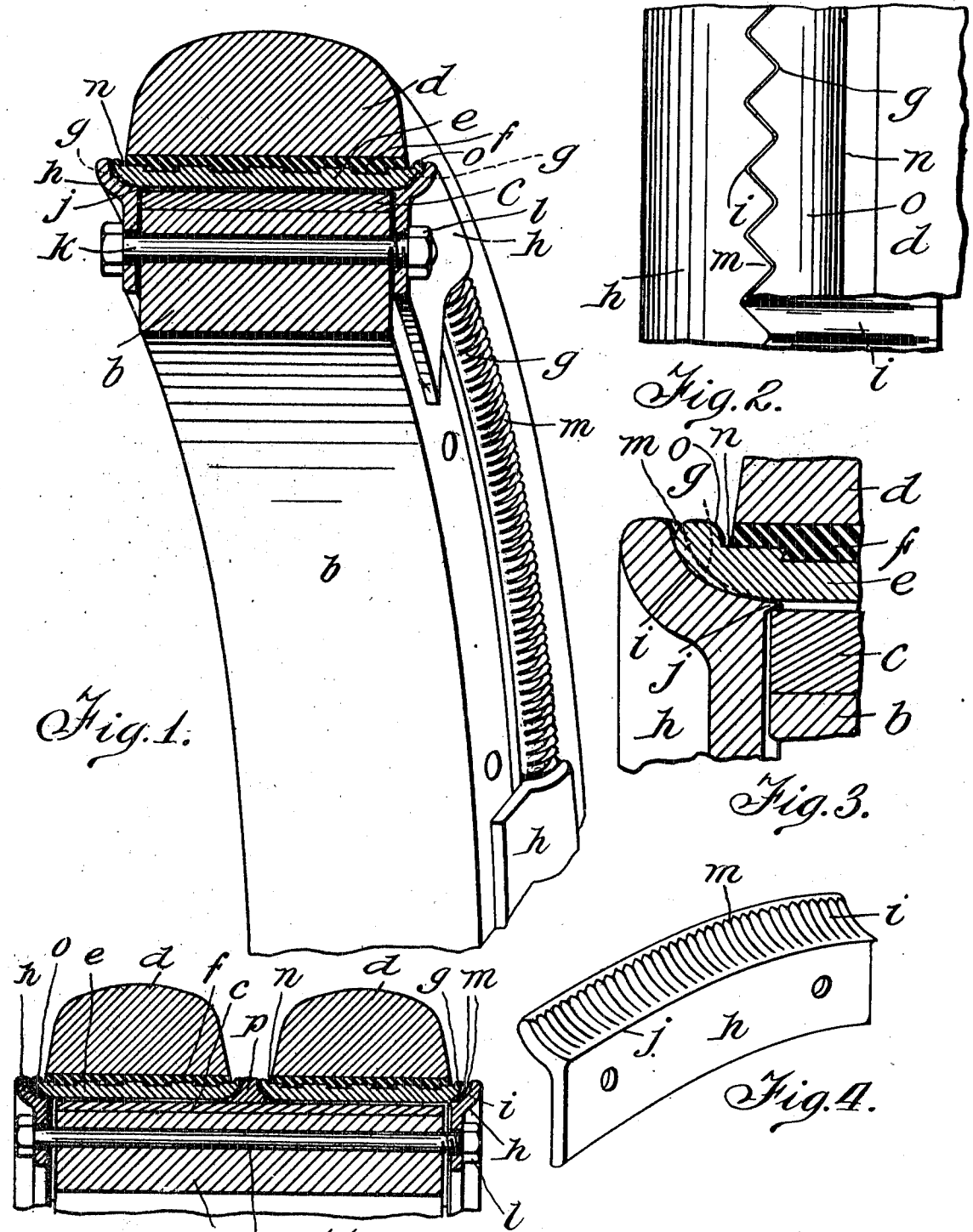

RICHARD EDWIN JAMIESON, OF MONTREAL, QUEBEC, CANADA.

TRUCK-TIRE.

1,096,721.  Specification of Letters Patent.  Patented May 12, 1914.

Application filed March 21, 1913. Serial No. 755,951.

*To all whom it may concern:*

Be it known that I, RICHARD EDWIN JAMIESON, a subject of the King of Great Britain, residing at Montreal, in the Province of Quebec, Canada, have invented certain new and useful Improvements in Truck-Tires; and I do hereby declare that the following is a full, clear, and exact description of the same.

The invention relates to the attachment of the resilient tread portion of a tire to the felly of a wheel, and particularly to improvements in that type wherein the tread portion is secured to a metallic base and a radial wedging action exerted upon the latter.

One of the objects of the invention is to provide a simplified means for effectively producing a distance compensator for and a wedging action between the base of the tire and the flanges of the wheel and combining therewith means for preventing circumferential slipping of the tire.

A further object is to provide a protection for the tread portion of the tire at the point where it is secured to the metallic base.

Further objects and advantages will be hereinafter described and particularly pointed out in the claims.

For full comprehension, however, of my invention reference must be had to the accompanying drawings forming a part of this specification, in which similar reference characters indicate the same parts and wherein—

Figure 1 illustrates partly in cross-section and partly in perspective view my improved tire assembled, one segment of the tire securing flange being removed to expose the toothed edge of the metallic base of the tire; Fig. 2 is an enlarged detail illustrating the engaging teeth in plan view; Fig. 3 is an enlarged detail section illustrating the connection between the flange felly and tire; Fig. 4 is a perspective view of one of the segments of the tire securing flange, with the toothed surface exposed; and Fig. 5 illustrates my improvements applied to a dual tire wheel.

In the drawings *b* indicates the felly of a wheel having the metal band *c* shrunk thereon and *d* the soft rubber tread secured to a metallic base *e* by means of the interlayer *f* of hard rubber which is vulcanized to such base.

Heretofore a radial wedging action was exerted upon the metallic base by means of separate rings or wedges located between the flanges secured to the sides of the felly and the base and to eliminate these intermediate rings I have provided the following construction. The edges of the metallic base *e* extend beyond the sides of the felly and are beveled as at *g* while the rings or segments forming the flanges *h* of the wheel present inner surfaces *i* beveled to correspond to the edges *g*, the correspondingly beveled surfaces being preferably curved as shown in the drawings.

As it is necessary to make the metallic base of the tire sufficiently larger in diameter than the felly to enable the tire to be readily slipped over the latter, there will be a space left between the two and in order to take up this space and compensate for the difference in diameter between the outer periphery of the felly and the inner surface of the tire base I have formed a continuous or broken flange or projection *j* upon the inside of each of the flanges *h* adjacent to the beveled surfaces *i*, the form of the flanges, whether segmental or annular, being dependent on that of the rim. The projections *j* are tapered from their bases and when the flanges *h* are secured to the felly, project inwardly from opposite sides of the latter and enter the space between the base *e* and the band of the felly.

The flanges *h* are bolted to the sides of the felly by bolts *k* passed through the latter and when the nuts *l* are tightened upon the bolts the beveled surfaces of the flanges engage directly with the correspondingly beveled surfaces of the metallic base and produce a radial wedging action which securely holds the tire upon the felly without the necessity of the above mentioned additional rings or wedges, while the tapered flanges *j* as they are forced between the base and felly wedge the two together and form a solid connection between them and constitute distance pieces which transmit the load from the tire directly to the felly.

To prevent circumferential slipping of the tire relatively to the felly I have formed the coinciding beveled surfaces *g* and *i*, respectively, with devices engaging with each other cross-wise of the wheel, such interengaging devices consisting preferably of radially disposed teeth m which are formed upon and follow the contour of the said curved surfaces g and i.

In order to protect the tread portion of the tire at the points n where it is vulcanized to the base, the latter is extended beyond the sides of such tread and an integral bead o is formed upon the outer surface of the latter near each side, these beads extending closely adjacent to the points n as seen in Fig. 1 of the drawings. The tops of the beads o may be level with or extend beyond the edge of the flanges h and protect the tire against injury such as may be caused by rock, dirt, gravel, etc.

I have described my invention in connection with a wheel having a single tire but, as seen in Fig. 5, it may be used to equal advantage with a wheel having a dual tire and in the latter case a central flange p is provided in addition to the side flanges h. The sides of the central flange are toothed and oppositely beveled to correspond to and co-act with the inner beveled edges of the metallic bases e of the dual tire while tapered flanges j are formed on this flange and act in like manner to the flanges j of the side flanges. Fig. 5 illustrates the several members just as the side flanges are being tightened to wedge the bases therebetween and the central flange.

The flanges h are herein illustrated as formed in segments but if so desired they may each be formed in one complete ring and in either form may be readily applied and secured in place, or removed by means of the bolts k and nuts l.

Although I have described and illustrated the protecting beads for the rubber portion of the tire, I do not herein claim the same as this construction forms the subject matter of a separate application.

What I claim is as follows—

1. In a wheel, the combination with a felly and a tire having a metallic base, the edges of which are curved and have teeth formed thereon, of flanges secured upon the sides of the felly and presenting toothed surfaces curved to correspond to and co-act with the edges of the said base.

2. In a wheel, the combination with a felly and a tire having a metallic base, the edges of which are curved and have teeth formed thereon, of flanges formed of segments secured upon the sides of the felly and presenting toothed surfaces curved to correspond to and co-act with the edges of the said base.

3. In a wheel: a felly, a tire having a metallic base, the edges of which are curved and have integral teeth formed thereon, and beads upon the outer surface of such base adjacent to the point of connection between it and the rubber portion of the tire; and metallic flanges secured upon the sides of the felly and presenting curved surfaces with integral teeth formed thereon adapted to directly engage the curved surfaces and teeth of the base.

4. In a wheel: a felly, a tire having a metallic base the edges of which are curved and have integral teeth formed thereon, and beads upon the outer surface of such base adjacent to the point of connection between it and the rubber portion of the tire; metallic flanges secured upon the sides of the felly and presenting curved surfaces with integral teeth formed thereon to directly engage the curved surfaces and teeth of the base, and inwardly tapered projections upon the side of each of said flanges and projecting between the metallic base and the felly.

In testimony whereof, I have signed my name to this specification, in the presence of two subscribing witnesses.

RICHARD EDWIN JAMIESON.

Witnesses:
STANLEY C. KING,
FRED J. TEARY.